United States Patent [19]

Hayashida et al.

[11] 4,418,372

[45] Nov. 29, 1983

[54] MAGNETIC ROTARY ENCODER

[75] Inventors: Hiroshi Hayashida, Mito; Tadashi Takahashi; Kunio Miyashita, both of Hitachi; Kanji Kawakami, Katsuta, all of Japan

[73] Assignee: Hitachi, Ltd., Tokyo, Japan

[21] Appl. No.: 173,842

[22] Filed: Jul. 30, 1980

[30] Foreign Application Priority Data

Aug. 2, 1979 [JP] Japan .................................. 54-98070
Aug. 2, 1979 [JP] Japan .................................. 54-98071
Sep. 5, 1979 [JP] Japan ................................ 54-112959

[51] Int. Cl.³ ........................... G11B 5/12; G11B 5/30
[52] U.S. Cl. .................................. 360/113; 360/122; 360/123; 338/32 R; 324/252
[58] Field of Search ............... 360/113, 112, 122, 123, 360/125; 340/347 P, 347 M; 338/32 R; 324/252

[56] References Cited

U.S. PATENT DOCUMENTS

| | | | |
|---|---|---|---|
| 3,493,694 | 2/1970 | Hunt | 360/113 |
| 3,716,781 | 2/1973 | Almasi et al. | 365/8 |
| 3,993,946 | 11/1976 | Makino | 338/32 R |
| 4,039,936 | 8/1977 | Jones et al. | 338/32 R |
| 4,179,719 | 12/1979 | Imamura et al. | 360/122 |
| 4,212,041 | 7/1980 | Lazzari et al. | 360/122 |
| 4,255,708 | 3/1981 | Wilson | 324/252 |
| 4,315,291 | 2/1982 | Lazzari | 360/113 |
| 4,320,428 | 3/1982 | Somers | 360/112 |

FOREIGN PATENT DOCUMENTS 1219577 1/1971 United Kingdom ................ 360/112

*Primary Examiner*—Alfred H. Eddleman
*Attorney, Agent, or Firm*—Antonelli, Terry & Wands

[57] ABSTRACT

Disclosed is a magnetic rotary encoder used in combination with a rotary body having plural pieces of magnetic information recorded on at least one circumferentially running track. The rotary encoder comprises a substrate having a surface disposed opposite to the rotary body and at least one magnetoresistive element formed on the surface of the substrate. The magnetoresistive element is formed on the substrate surface as an integral pattern including at least two portions extending substantially in the radial direction of the rotary body in a relation opposite to the magnetic information recorded portion of the rotary body, two lead connection terminal portions formed at the outer ends of the radially extending portions respectively, and a circumferentially extending portion interconnecting the radially extending portions at their ends, so as to form a single electrical signal path which passes both of the radially extending portions and terminates in the two lead connection terminal portions. These lead connection terminal portions are disposed outside of the outer peripheral edge of the rotary body.

21 Claims, 22 Drawing Figures

MAGNETIC ROTARY ENCODER

BACKGROUND OF THE INVENTION

1. Field of the Invention

This invention relates to a magnetic rotary encoder, and more particularly to an apparatus of the kind described above which uses a magnetoresistive element.

2. Prior Art of the Invention

It is commonly known that, when a magnetoresistive element made of a magnetoresistive material such as permalloy is placed in a magnetic field and current is supplied thereto, the resistance value of the magnetoresistive element varies depending on the intensity of the magnetic field. Thus, when such a magnetoresistive element is used in lieu of a magnetic head to sense magnetic information recorded on a magnetic recording medium, the recorded magnetic information can be reliably sensed even when the relative velocity of the magnetic recording medium and the magnetoresistive element is zero, that is, even in a stopped condition of the magnetic recording medium. It is also commonly known that such a principle can be utilized to sense the velocity of rotation or angular position of rotation of a rotating body by the magnetoresistive element. Suppose, for example, that serial pieces of magnetic information are recorded on a circumferential track provided on the surface of a rotary magnetic recording medium, and the magnetoresistive element is disposed to extend in the radial direction of the magnetic recording medium with its sensing portion brought close and opposite to the magnetic information recorded on the magnetic recording medium. In such a case, one of the lead connection terminal portions connected to the respective ends of the sensing portion of the magnetoresistive element can be disposed outside of the outer periphery of the rotary magnetic recording medium without any difficulty. However, in this arrangement, the other lead connection terminal portion of the magnetoresistive element is necessarily situated at a position opposite to the associated surface portion of the magnetic recording medium, and a lead is fixed thereto by means such as soldering. The arrangement above described in therefore defective in that the desired close approach of the magnetoresistive element toward the magnetic recording medium is obstructed by the amount corresponding to the protuberant head of solder. It is apparent that the sensor sensitivity increases as the sensing portion of the magnetoresistive element is situated closest possible to the magnetic information recorded on the magnetic recording medium.

When serial pieces of magnetic information are to be recorded on a recording medium such as a plastic magnet, it is difficult to record the information at a high recording density by being limited by the recording capability of a conventional recording unit, and a length of about 1 mm is generally required for recording one piece or unit of information according to the present technique of information writing. Thus, for example, information as many as about 100 pulses can only be recorded on a circumferential track when the plastic magnet is cylindrical in shape and has a diameter of 40 mm. Therefore, in order to read the recorded information with a higher resolution during rotation of the plastic magnet, that is, in order to improve the resolution, it is known to radiately dispose a plurality of magnetoresistive elements in a relatively phase-shifted relation and opposite to magnetic information recorded on a recording medium. Such an arrangement is disclosed, for example, in Japanese patent application No. 51-145148 (filed on Dec. 2, 1976 and laid-open for inspection on June 21, 1978 as patent application Laid-Open No. 53-69684). The cited Japanese laid-open application discloses a rotation velocity sensing apparatus in which a serial pieces of magnetic information are recorded on the surface of a rotating disc, and a plurality of magnetoresistive elements spaced apart by a predetermined distance from each other are disposed close and opposite to the magnetic information recorded on the disc so that plural velocity information signals having a phase difference therebetween can be derived from the individual elements. In this case too, the protuberant head of solder soldering a lead to the radially inner lead connection terminal portion of each magnetoresistive element provides also a hindrance to the desired improvement in the sensor sensitivity, as pointed out hereinbefore. In addition, the necessity for the positioning of the plural magnetoresistive elements at the positions spaced apart by the predetermined distance poses a problem from the viewpoint of accuracy of their positions. When the mounted positions of the magnetoresistive elements deviate from the predetermined positions, the output pulses will not have the same pulse interval or the output sensitivity will be degraded. Especially, when the width of each piece of recorded information on the magnetic recording medium is narrowed to increase the number of output pulses thereby improving the resolution or sensor sensitivity, the space between the magnetoresistive elements must also be narrowed to meet the narrowed width of each piece of the recorded information. However, the disclosed apparatus is still defective in that there is a limitation in the accuracy of positioning the magnetoresistive elements, and the number of output pulses cannot be increased over some limit.

SUMMARY OF THE INVENTION

It is an object of the present invention to obviate the aforementioned defects of the prior art.

Another object of the present invention is to provide a magnetic rotary encoder which solves the aforementioned problem resulting from the protuberant head of solder at the lead connection terminal portion of each of the magnetoresistive elements and which can therefore improve the sensor sensitivity.

Still another object of the present invention is to provide a magnetic rotary encoder in which the distance between the magnetoresistive elements is narrowed without degrading the positioning accuracy of the magnetoresistive elements thereby improving the resolution or sensor sensitivity.

DESCRIPTION OF THE PREFERRED EMBODIMENTS

Figure 1:
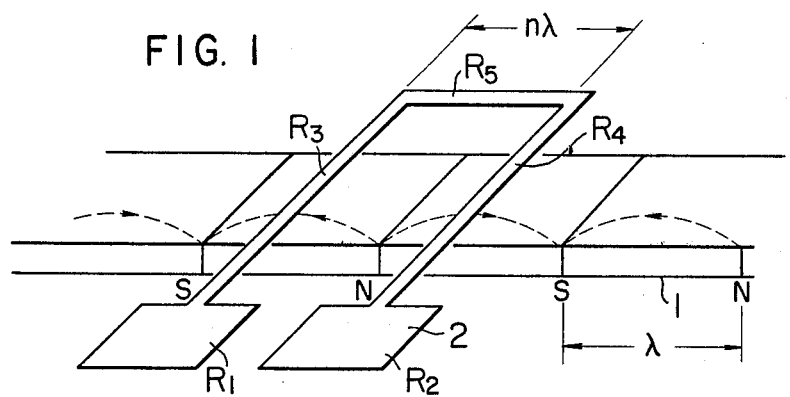
FIG. 1 is a schematic perspective view illustrating the basic principle of the present invention.
Figure 2:
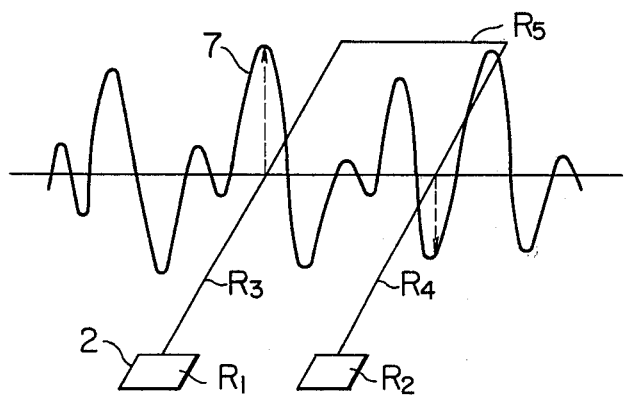
FIG. 2 illustrates how a voice signal is sensed by the magnetic rotary encoder according to the present invention.

Referring now to the drawings, FIG. 1 illustrates the basic principle of the present invention. In FIG. 1, magnetic information is recorded on a recording medium 1 in the form of digital signals located with a predetermined pitch $\lambda$. A generally U-shaped magnetoresistive element 2 is associated with the recording medium 1 and comprises a first lead connection terminal or terminal portion $R_1$, a second lead connection terminal or terminal portion $R_2$, a first sensing member or portion $R_3$ extending radially over the recording medium 1 from the terminal portion $R_1$, a second sensing member or portion $R_4$ extending radially over the recording medium 1 again from the terminal portion $R_2$, and a bridging member or portion $R_5$ extending circumferentially in parallel with the recording medium 1 and connecting the ends of the sensing members or portions $R_3$ and $R_4$. It will be seen in FIG. 1 that the turning point between the members or portions $R_5$ and $R_4$ is selected to have a distance of $n\lambda$ (where n is a positive integer and is 1 in FIG. 1) from the turning point between the members or portions $R_3$ and $R_5$, and the lead connection terminals or terminal portions $R_1$ and $R_2$ are disposed outside of the outer peripheral edge of the recording medium 1. Such a technique cannot be realized in a prior art sensor means used for sensing an analog signal, for example, an audio-signal. This is because, when an audio-signal having a waveform 7 as shown in FIG. 2 is sensed by a U-shaped magnetoresistive element 2 as shown in FIG. 1, the signal sensed by one of the sensing portions $R_3$ and $R_4$ will be a noise signal since the recorded signal is not periodic. For this reason, a linearly radially extending magnetoresistive element disposed opposite to recorded magnetic information as described hereinbefore could only be utilized for sensing a voice signal.

Suppose that the lead connection terminal portions $R_1$ and $R_2$ of the magnetoresistive element 2 shown in FIG. 1 have resistance values $r_1$ and $r_2$ respectively, the sensing portions $R_3$ and $R_4$ have resistance values $r_3$ and $r_4$ respectively when they are not opposed by the recorded magnetic information, and the bridging portion $R_5$ has a resistance value $r_5$. The resistance values $r_3$ and $r_4$ of the sensing portions $R_3$ and $R_4$ vary by amounts of $\Delta r_3$ and $\Delta r_4$ respectively when they sense the recorded magnetic information. Then, the sensor sensitivity $\Delta r/r$ is expressed as follows:

$$\frac{\Delta r}{r} = \frac{\Delta r_3 + \Delta r_4}{r_1 + r_2 + r_3 + r_4 + r_5}$$

Therefore, the resistance values of the portions except the sensing portions $R_3$ and $R_4$, that is, the resistance values $r_1$, $r_2$ and $r_5$ of the lead connection terminal portions $R_1$, $R_2$ and bridging portion $R_5$ must be decreased so as to improve the sensitivity.

Figure 3:
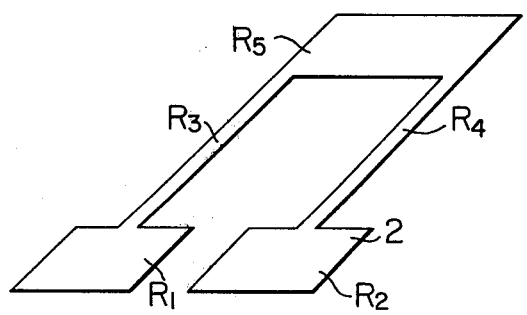
FIG. 3 is a schematic perspective view of one form of the magnetoresistive element employed in the present invention.

FIG. 3 shows another form of the magnetoresistive element 2 in which the portions except the sensing portions $R_3$ and $R_4$ are widened. In the form shown in FIG. 3, the relation $r_1+r_2+r_5 < < r_3+r_4$ holds, and the sensor sensitivity $\Delta r/r$ can be increased as follows:

$$\frac{\Delta r}{r} \approx \frac{\Delta r_3 + \Delta r_4}{r_3 + r_4}$$

Figure 4:
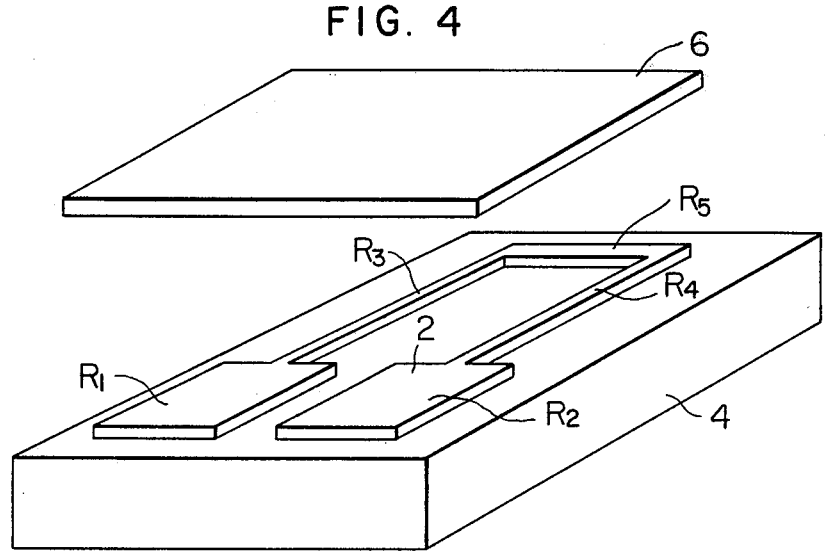
FIG. 4 is a schematic, exploded perspective view of an embodiment of the magnetic rotary encoder according to the present invention.

FIG. 4 shows an embodiment of the magnetic rotary encoder according to the present invention. FIG. 4 shows that a magnetoresistive element 2 as described with reference to FIG. 1 is evaporated on a substrate 4, and shows also that a protective covering 6 is about to be disposed on the substrate 4. The substrate 4 may, for example, be a glass substrate having a thickness of about 1 mm. A magnetoresistive material, for example, permalloy having a thickness of about 200 Å is preferably evaporated on the glass substrate 4 to provide the magnetoresistive element 2, and a protective covering 6, for example, an electrical insulating glass covering having a thickness of about 50 μm is then preferably deposited to cover the magnetoresistive element 2. The glass covering 6 is preferably bonded to the substrate 4 with a suitable bonding material, for example, an epoxy type bonding agent which fills completely any gaps left between the substrate 4 and the glass covering 6.

Figure 5:
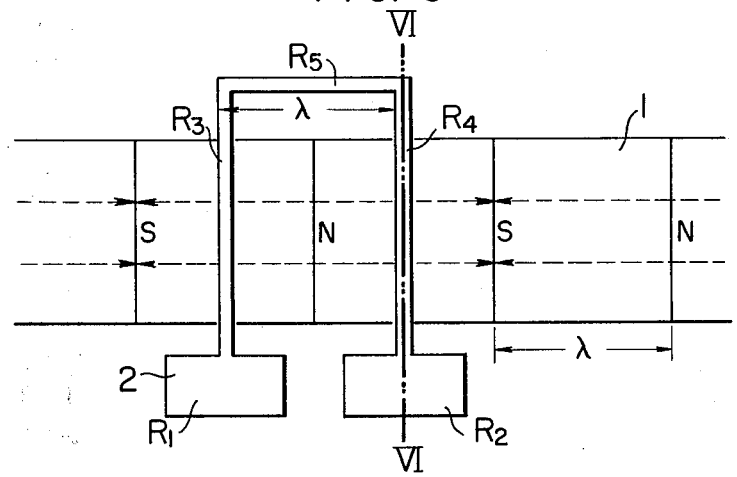
FIG. 5 is a developed plan view schematically showing the relation between the pitch of recorded magnetic information and the pitch of the sensing portions of the magnetoresistive element in the rotary encoder shown in FIG. 4.

In the thus constructed magnetic rotary encoder, the substrate 4 acts to maintain the mechanical strength of the encoder and acts also as a base on which the magnetoresistive element 2 is evaporated. As shown in FIG. 5, the magnetoresistive element 2 which senses magnetic information recorded on a recording medium 1 comprises a pair of lead connection terminal portions $R_1$ and $R_2$ to each of which a lead is soldered, a pair of sensing portions $R_3$ and $R_4$ sensing magnetic flux, and a bridging portion $R_5$ connecting the portions $R_3$ and $R_4$. The lead connection terminal portions $R_1$ and $R_2$ are wide enough to facilitate finishing of the soldered connections. Although the sensitivity increases with a narrower width of each of the magnetic flux sensing portions $R_3$ and $R_4$, the current density has an upper limit, and the output level will not increase beyond a limit. Therefore, the width of each of these portions $R_3$ and $R_4$ is preferably selected to be about several-ten μm in consideration of the density of recorded magnetic information.

The sensing portions $R_3$ and $R_4$ are spaced apart from each other by a distance which is n times the pitch λ of the pieces of recorded magnetic information. Because of this spacing, the resistance variations $\Delta r_3$ and $\Delta r_4$ of the respective sensing portions $R_3$ and $R_4$ have the same phase. FIG. 5 shows that n=1, that is, the sensing portions $R_3$ and $R_4$ are disposed to be spaced apart by λ which is the pitch of the pieces of recorded magnetic information.

Figure 6:
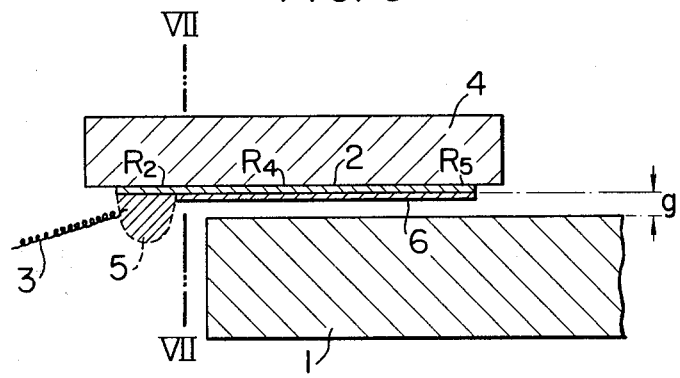
FIG. 6 is a schematic sectional view taken along the line VI—VI in FIG. 5.

FIG. 6 is a schematic sectional view taken along the line VI—VI in FIG. 5 in which the distance between the sensing portions $R_3$ and $R_4$ is selected to be λ.

It wil be seen in FIG. 6 that, in addition to the lead connection terminal portion $R_1$ of the magnetoresistive element 2 evaporated on the substrate 4, the other lead connection terminal portion $R_2$ is also situated outside of the outer periphery of the recording medium 1 which is a rotating body. Therefore, the gap g between the magnetoresistive element 2 and the recording medium 1 can be reduced to be substantially equal to the thickness of the protective covering 6 without regard to the thickness of the head of solder 5. This means that the reading sensitivity can be increased or improved. It will be readily understood that, in the case of the prior art, one of the lead connection terminal portions of the magnetoresistive element 2 is situated at a position opposite to a surface portion of the recording medium 1, and the gap g between the magnetoresistive element 2 and the recording medium 1 must inevitably become large by the amount corresponding to the protuberant head of solder.

When the U-shaped magnetoresistive element 2 is used for sensing recorded information in the form of an analog signal such as an audio-signal, a noise output signal appears from one of the sensing portions $R_3$ and $R_4$, as described hereinbefore. However, in the case of digital information where pieces of record are disposed at a predetermined pitch, the U-shaped magnetoresistive element 2 can sense the magnetic information without producing any noise output signal. Consequently, both of the two sensing portions $R_3$ and $R_4$ can participate in the sensing operation so that the output level can be made higher than hitherto.

In the embodiment shown in FIG. 5, the width of the bridging portion $R_5$ is depicted to be equal to that of the sensing portions $R_3$ and $R_4$. However, the width of the bridging portion $R_5$ may be increased to provide a pattern as shown in FIG. 3 for the purpose of improving the sensitivity, as described already hereinbefore.

Figure 7:
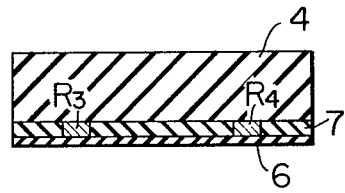
FIG. 7 is a schematic sectional view taken along the line VII—VII in FIG. 6.

FIG. 7 is a schematic sectional view taken along the line VII—VII in FIG. 6. It will be seen in FIG. 7 that the gap between the substrate 4 and the glass covering 6 is preferably completely filled with the bonding agent 7. The complete filling of the gap prevents exposure of the sensing portions $R_3$ and $R_4$ to air, because permalloy tends to be deteriorated in quality when kept exposed to air for a long period of time.

Figure 8:
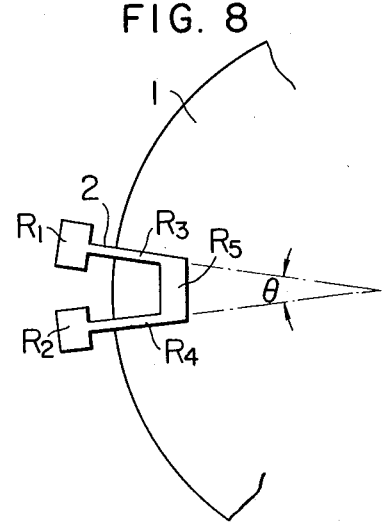
FIG. 8 is a schematic plan view showing the shape of another form of the magnetoresistive element and its arrangement relative to a recording medium in another embodiment of the rotary encoder according to the present invention.

In the embodiments described hereinbefore, the radius of the recording medium 1 has been considered to be sufficiently large. However, when the radius is relatively small, that is, when the curvature of the recording medium 1 is relatively large, the sensing portions $R_3$ and $R_4$ of the magnetoresistive element 2 must have such a positional interrelation that they define therebetween an angle θ suitably selected depending on the curvature as shown in FIG. 8. Such a shape can be obtained by merely designing the photomask pattern according to the desired shape, and the structure itself remains unchanged. It will be understood that the magnetoresistive element 2 of such a shape can be made with high accuracy.

Figure 9:
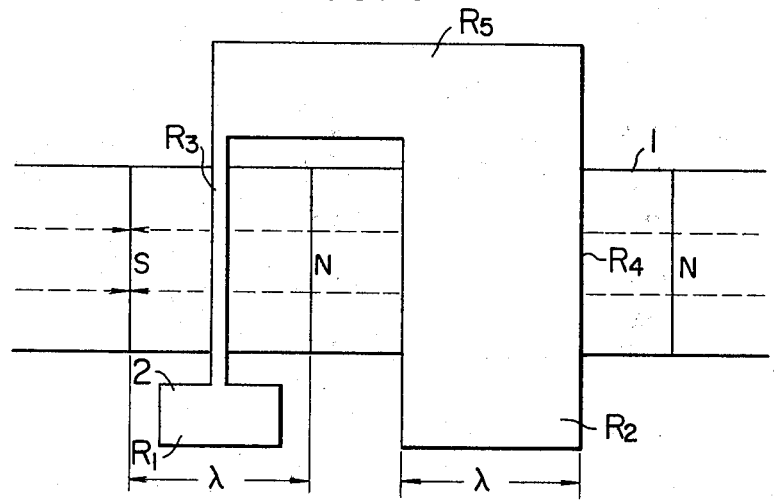
FIG. 9 is a view similar to FIG. 5 but showing still another embodiment of the rotary encoder according to the present invention.

In the aforementioned embodiments, both of the sensing portions $R_3$ and $R_4$ of the U-shaped magnetoresistive element 2 participate in the signal sensing operation. However, as shown in FIG. 9, only one of these two sensing portions $R_3$ and $R_4$ may participate in the sensing operation. Referring to FIG. 9, only the portion $R_3$ is made to have a narrow width, while the other portion $R_4$ has a wide width. In such a structure, the portion $R_3$ only participates in the signal sensing operation, and the portion $R_4$ is combined integrally with the lead connection portion $R_2$ and the bridging portion $R_5$ to provide a portion which has a very low resistance. In this case, the portion $R_4$ may have a width equal to the pitch λ of recorded magnetic information as shown in FIG. 9 so that the portion $R_4$ may be insensitive to the magnetic information.

According to the aforementioned embodiments of the present invention, a magnetoresistive element is shaped in the form of a U so that each of two lead connection terminal portions can be disposed outside of the outer peripheral edge of a rotating magnetic recording body or medium. Therefore, the sensing portions of the magnetoresistive element can be disposed close to the recording surface of the rotating magnetic recording medium to improve the sensor sensitivity. Further, due to the fact that the magnetoresistive element is formed on a substrate by means such as evaporation, the sensing portions can be accurately positioned at their predetermined positions to improve the sensitivity and accuracy of sensing magnetic information.

Figure 10:
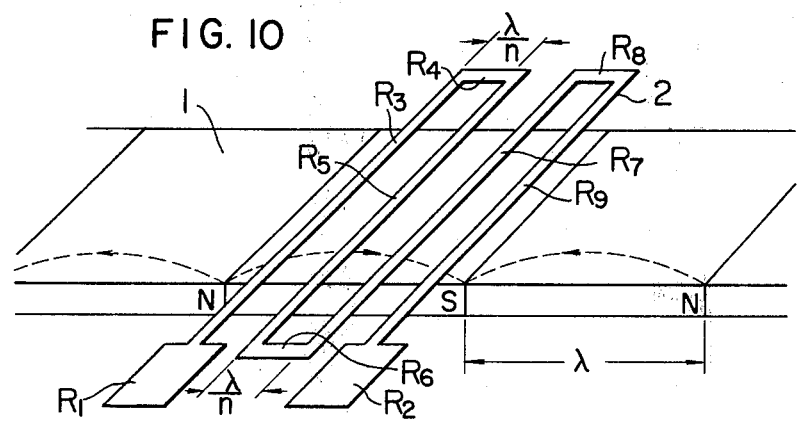
FIG. 10 is a schematic perspective view illustrating a development of the basic principle of the present invention.

FIG. 10 illustrates a further development of the basic principle of the present invention described with reference to FIG. 1. Referring to FIG. 10, serial pieces of magnetic information are recorded on a recording medium 1 in the form of digital signals disposed with a predetermined pitch λ. A generally comb-shaped magnetoresistive element 2 may comprise plural sensing portions (four in FIG. 10) by bending the element with a pitch of $\lambda/n$. Such a technique cannot be realized in a prior art sensor means used for sensing an analog signal, for example, an audio-signal. This is because, when an audio-signal is sensed by such a comb-shaped magnetoresistive element 2 as shown in FIG. 10, the signal sensed by the sensing portions $R_5$, $R_7$ and $R_9$ in view of that sensed by the sensing portion $R_3$, for example, will be a noise signal since the recorded signal is not periodic, as described already with reference to FIG. 2.

Suppose that the lead connection terminal portions $R_1$ and $R_2$ of the magnetoresistive element 2 shown in FIG. 10 have resistance values $r_1$ and $r_2$ respectively, the sensing portions $R_3$, $R_5$, $R_7$ and $R_9$ have resistance values $r_3$, $r_5$, $r_7$ and $r_9$ respectively, and the bridging portions $R_4$, $R_6$ and $R_8$ have resistance values $r_4$, $r_6$ and $r_8$ respectively. The resistance values $r_3$, $r_5$, $r_7$ and $r_9$ of the sensing portions $R_3$, $R_5$, $R_7$ and $R_9$ vary by amounts of $\Delta r_3$, $\Delta r_5$, $\Delta r_7$ and $\Delta r_9$ respectively when they sense the recorded magnetic information. Then, the sensor sensitivity $\Delta r/r$ is expressed as follows:

$$\frac{\Delta r}{r} = \frac{\Delta r_3 + \Delta r_5 + \Delta r_7 + \Delta r_9}{r_1 + r_2 + r_3 + r_4 + r_5 + r_6 + r_7 + r_8 + r_9}$$

Therefore, the resistance values of the portions except the sensing portions $R_3$, $R_5$, $R_7$ and $R_9$, that is, the resistance values $r_1$, $r_2$, of the respective lead connection terminal portions $R_1$, $R_2$ and those $r_4$, $r_6$, $r_8$ of the respective bridging $R_4$, $R_6$, $R_8$ must be decreased so as to improve the sensitivity. Therefore, when the lead connection terminal portions $R_1$, $R_2$ and the bridging portions $R_4$, $R_6$, $R_8$ are widened to satisfy the relation $r_1+r_2+r_4+r_6+r_8 << r_3+r_5+r_7+r_9$, the sensor sensitivity $\Delta r/r$ can be increased as follows:

$$\frac{\Delta r}{r} \approx \frac{\Delta r_3 + \Delta r_5 + \Delta r_7 + \Delta r_9}{r_3 + r_5 + r_7 + r_9}$$

Figure 11:
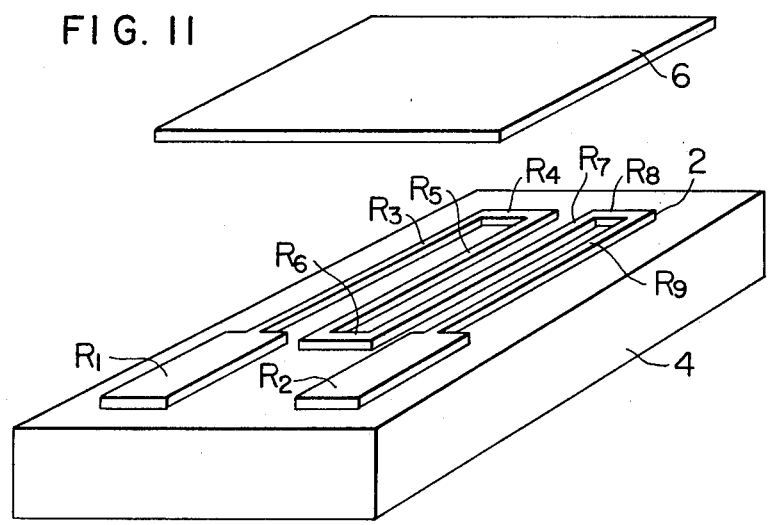
FIG. 11 is a schematic, exploded perspective view of yet another embodiment of the rotary encoder based on the developed basic principle of the present invention shown in FIG. 10.

FIG. 11 shows an embodiment of the present invention based on the principle illustrated in FIG. 10, in which a magnetoresistive element 2 as described with reference to FIG. 10 is evaporated on a substrate 4, and a protective covering 6 is about to be disposed on the substrate 4. The materials of the magnetoresistive element 2, substrate 4 and protective covering 6 may be similar to those described with reference to FIG. 4. The substrate 4 acts to maintain the mechanical strength of the encoder. The lead connection terminal portions $R_1$ and $R_2$ are wide enough to facilitate finishing of the soldered connections. The sensitivity increases with a narrower width of each of the magnetic flux sensing portions $R_3$, $R_5$, $R_7$ and $R_9$. However, for reasons as described already hereinbefore, the width of each of the sensing portions $R_3$, $R_5$, $R_7$ and $R_9$ is preferably selected to be about several-ten $\mu m$.

Figure 12:
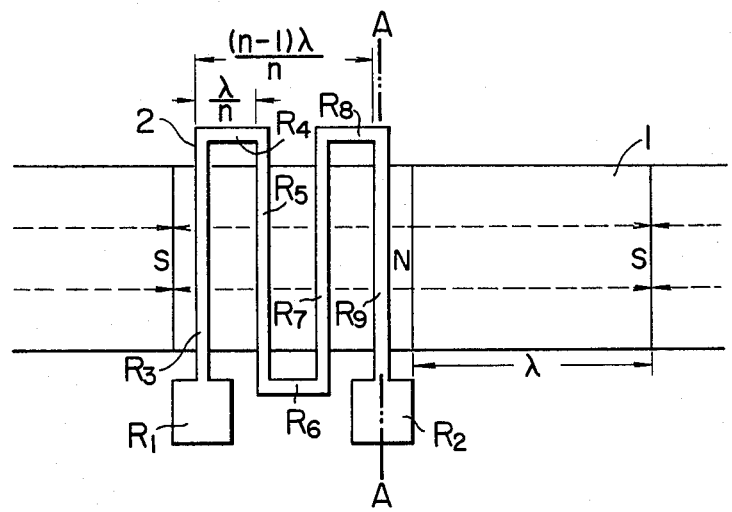
FIG. 12 is a developed plan view schematically showing the relation between the pitch of recorded magnetic information and the pitch of the sensing portions of the magnetoresistive element in the rotary encoder shown in FIG. 11.
Figure 13:
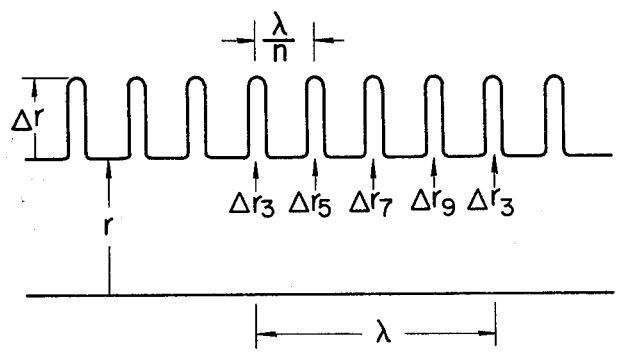
FIG. 13 illustrates variations in the resistance values of the sensing portions of the magnetoresistive element shown in FIG. 12.

It will be seen in FIG. 12 that the sensing portions $R_3$, $R_5$, $R_7$ and $R_9$ are arranged at a pitch of $\lambda/n$ (where $\lambda$ is the pitch of the recorded pieces of magnetic information, and n is a positive integer larger than 2), so that resistance variations $\Delta r_3$, $\Delta r_5$, $\Delta r_7$ and $\Delta r_9$ of the respective sensing portions $R_3$, $R_5$, $R_7$ and $R_9$ are sequentially out of phase at a rate of $\lambda/n$. In other words, the resolution is n times the density of recorded magnetic information.

When the value of n is the pitch $\lambda/n$ is selected to be an even number or 4 herein, and the turning point between the bridging portion $R_8$ and the sensing portion $R_9$ is selected to be spaced apart by a distance of $(n-1)\lambda/n = (4-1)\lambda/4 = \frac{3}{4}\lambda$ from the turning point between the sensing portion $R_3$ and the bridging portion $R_4$ as shown in FIG. 12, both of the lead connection terminal portions $R_1$ and $R_2$ can be situated outside of the outer periphery of the recording medium 1. In such a structure, a section taken along the line A–B in FIG. 12 is similar to that shown in FIG. 6.

It will be seen in FIG. 12 that, in addition to the lead connection terminal portion $R_1$ of the magnetoresistive element 2 evaporated on the substrate 4, the other lead connection terminal portion $R_2$ is also situated outside of the outer periphery of the recording medium 1 which is a rotating body. Therefore, the gap g between the magnetoresistive element 2 and the recording medium 1 can be reduced to be substantially equal to the thickness of the protective covering 6 without regard to the thickness of the head of solder 5. This means that the reading sensitivity can be improved.

Figure 14:
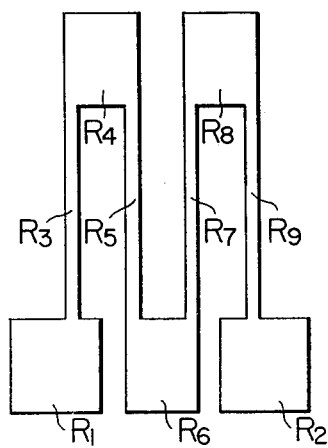
FIG. 14 is a schematic plan view of another form of the magnetoresistive element employed in the present invention.

FIG. 14 shows a modified form of the magnetoresistive element 2 shown in FIG. 12. In the mask pattern shown in FIG. 14, the width of each of the bridging portions $R_4$, $R_6$ and $R_8$ is increased to decrease the resistance value thereof for the purpose of improving the sensor sensitivity. In such a form of the magnetoresistive element 2, the relation $r_1+r_2+r_4+r_6+r_8 << r_3+r_5+r_7+r_9$ holds, and the sensor sensitivity increases as follows:

$$\frac{\Delta r}{r} \approx \frac{\Delta r_3 + \Delta r_5 + \Delta r_7 + \Delta r_9}{r_3 + r_5 + r_7 + r_9}$$

It is to be understood that a magnetoresistive element of three-terminal type is provided when the portion $R_6$ in FIG. 14 is utilized also as an additional lead connection terminal portion.

Figure 15:
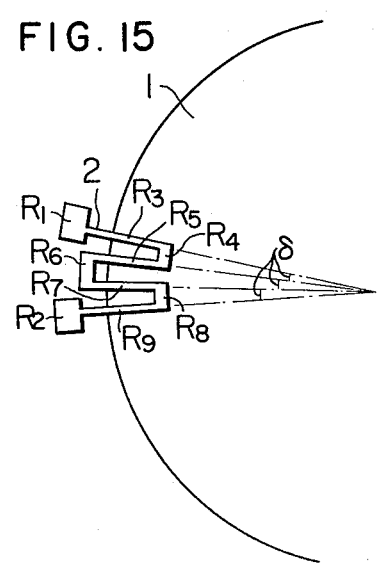
FIG. 15 is a schematic plan view showing the shape of another form of the magnetoresistive element and its arrangement relative to a recording medium in another embodiment of the rotary encoder according to the present invention.

In the embodiments described with reference to FIGS. 10 to 14, the radius of the recording medium 1 has been considered to be sufficiently large. However, when the radius of the recording medium 1 is relatively small, that is, when the curvature of the recording medium 1 is relatively large, the sensing portions $R_3$, $R_5$, $R_7$ and $R_9$ of the magnetoresistive element 2 must have such a positional interrelation that they define therebetween an angle $\delta$ suitably selected depending on the curvature as shown in FIG. 15. It will be understood that the magnetoresistive element 2 of such a shape can operate with high sensitivity. Such a shape can be obtained with high accuracy by merely designing the photomask pattern according to the desired shape.

Figure 16:
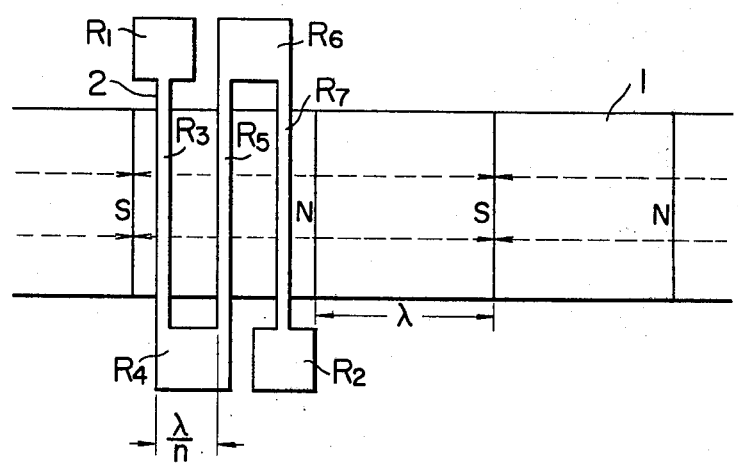
FIG. 16 is a view similar to FIG. 9, but showing still another embodiment of the rotary encoder according to the present invention.

In the embodiments shown in FIGS. 10 to 12, 14 and 15, the value of n in the pitch $\lambda/n$ is selected to be an even number, and the final turning point is selected to be spaced apart by a distance of $(n-1)\lambda/n$ from the first turning point to situate both of the two lead connection terminal portions $R_1$ and $R_2$ outside of the outer periphery of the recording medium 1 so as to minimize the gap g between the magnetoresistive element 2 and the recording medium 1 thereby improving the reading sensitivity. However, when it is merely intended to increase the number of sensing portions for the purpose of improving the resolution, the value of n in the pitch $\lambda/n$ may merely by selected to be a positive integer larger than 2. In FIG. 16, the value of n is selected to be $n=3$, and in such a case, the lead connection terminal portions $R_1$ and $R_2$ are oppositely situated with respect to the magnetic information.

It will be understood from the above description of the embodiments of the present invention shown in FIGS. 10 to 15 as well as FIG. 16 that a comb-shaped magnetoresistive element comprises a plurality of sensing portions arranged at a pitch of $\lambda/n$ (where n is a positive integer larger than 2) so that the resolution of a rotary encoder of this kind can be improved. Further, the sensing portions of the magnetoresistive element can be accurately positioned at their predetermined relative positions since the element is deposited on the substrate by means such as evaporation.

Figure 17:
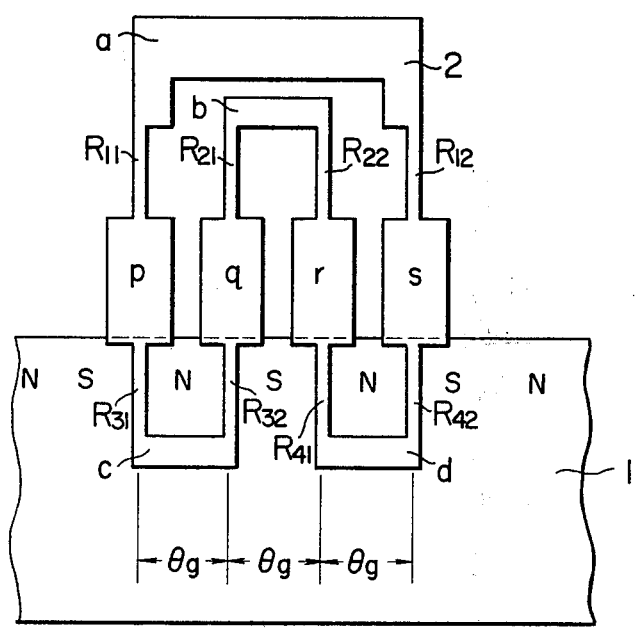
FIG. 17 is an enlarged schematic plan view of a main part of yet another embodiment of the rotary encoder according to the present invention.
Figure 18:
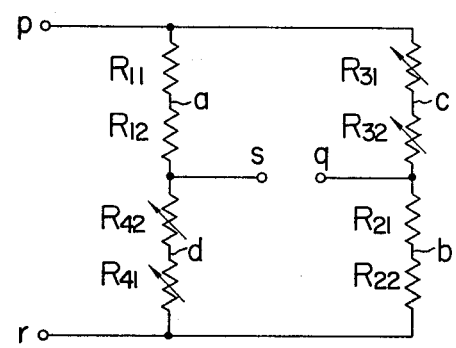
FIG. 18 is an electrical circuit diagram of the rotary encoder shown in FIG. 17.

FIG. 17 shows another embodiment of the present invention which comprises a magnetoresistive element having a structure forming a bridge circuit as shown in FIG. 18. Although a rotary encoder comprising a plurality of magnetoresistive elements forming a bridge circuit is disclosed in U.S. Pat. No. 3,274,575 to Heinz Adolf de Koster, the disclosed rotary encoder has still various defects similar to the prior art defects pointed out already hereinbefore.

Referring to FIG. 17, a magnetoresistive element 2 comprises terminal portions p, q, r, s, resistive portions $R_{11}$, $R_{12}$, $R_{21}$, $R_{22}$, $R_{31}$, $R_{32}$, $R_{41}$, $R_{42}$, and connecting or bridging portions a, b, c, d. All of the terminal portions, resistive portions and bridging portions are integrally combined to provide the magnetoresistive element 2 of a single pattern. The terminal portions p, q, r and s are formed on a substantially central area of a substrate (which is not shown but similar to the substrate 4 of FIG. 4) to be sequentially arranged along the outer periphery of a rotating magnetic recording medium 1. As seen in FIG. 18, the terminal portions p and r operate as a pair of input terminals, while the terminal portions q and s operate as a pair of sensor output terminals.

As shown in FIG. 18, a pair of resistive portions are inserted in each of the four arms of the bridge circuit. More precisely, the resistive portions $R_{31}$, $R_{32}$ and $R_{41}$, $R_{42}$ inserted in the respective arms of of one of the diagonally opposite arm pairs are arranged in parallel with the array of the terminal portions p, q, r, s on the front side thereof so that they are opposed by magnetic information recorded on the recording medium 1. The resistive portions $R_{11}$, $R_{12}$ and $R_{21}$, $R_{22}$ inserted in the respective arms of the other diagonally opposite arm pair are arranged in parallel with the array of the terminal portions p, q, r, s on the rear side remote from the recording medium 1.

To constitute the bridge circuit above described, the resistive portions $R_{31}$ and $R_{11}$ are oppositely connected to each other to the terminal portion p, the resistive portions $R_{32}$ and $R_{21}$ are oppositely connected to each other to the terminal portion q, the resistive portions $R_{41}$ and $R_{22}$ are oppositely connected to each other to the terminal portion r, and the resistive portions $R_{42}$ and $R_{12}$ are oppositely connected to each other to the terminal portion s. Further, the resistive portion $R_{11}$ is connected to the resistive portion $R_{12}$ by the bridging portion a, the resistive portion $R_{21}$ is connected to the resistive portion $R_{22}$ by the bridging portion b, the resistive portion $R_{31}$ is connected to the resistive portion $R_{32}$ by the bridging portion c, and the resistive portion $R_{41}$ is connected to the resistive portion $R_{42}$ by the bridging portion d. The terminal portions p, q, r, s and the bridging portions a, b, c, d, are designed to be wider than the resistive portions $R_{11}$, $R_{12}$, $R_{21}$, $R_{22}$, $R_{31}$, $R_{32}$, $R_{41}$, $R_{42}$ so that they have a sufficiently lower resistance value.

The magnetoresistive element 2 shown in FIG. 17 is formed by, for example, evaporating or photo-etching a magnetoresistive material such as permalloy on the surface of a planar substrate of an electrical insulating material such as glass, in the same manner as described with reference to FIG. 4. Then, a protective covering of a material such as glass is bonded to the substrate to provide a magnetoresistive sensor assembly.

Figure 19:
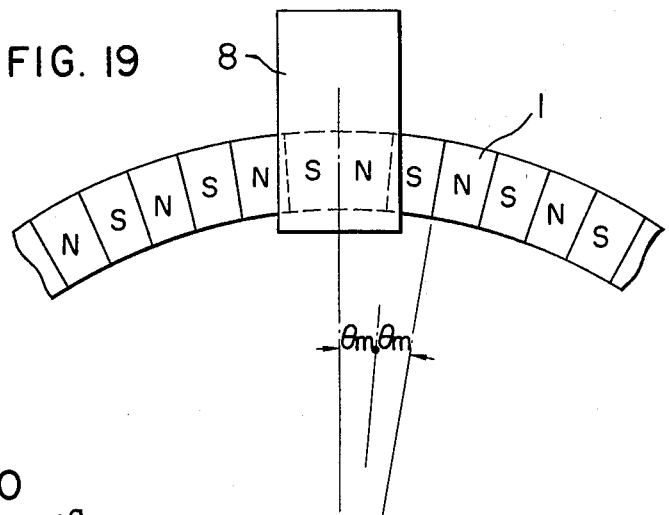
FIG. 19 is a schematic plan view showing the relation between the rotary encoder and the recording medium shown in FIG. 17.

FIG. 19 shows the positional relation between the magnetic recording medium 1 and the magnetoresistive sensor assembly 8 constructed in the manner above described. Serial pieces of magnetic information in the form of N and S are recorded on the magnetic recording medium 1 along the direction of rotation of the recording medium 1. One information unit is recorded over a width corresponding to an angle $\theta m$ as shown in FIG. 19. The magnetoresistive sensor assembly 8 is disposed oppositely to the magnetic recording medium 1 through a very narrow gap.

Returning to FIG. 17 again, the resistive portions $R_{31}$, $R_{32}$, $R_{41}$ and $R_{42}$ arranged on the front side of the array of the terminal portions p, q, r and s are spaced apart from each other by a distance of $\theta g$. This distance $\theta g$ is designed to be m times (where m is a positive integer) the width $\theta m$ of each information unit recorded on the magnetic recording medium 1 shown in FIG. 17, and $\theta g$ is selected to be equal to $\theta m$ in this embodiment. These resistive portions $R_{31}$, $R_{32}$, $R_{41}$ and $R_{42}$ are disposed close and opposite to the magnetic information recorded on the magnetic recording medium 1 as seen in FIG. 17. Since these resistive portions $R_{31}$, $R_{32}$, $R_{41}$ and $R_{42}$ are subject to magnetic fields of the same intensity, their resistance values are simultaneously varied under influence of the field intensities due to rotation of the magnetic recording medium 1. On the other hand, the resistive portions $R_{11}$, $R_{12}$, $R_{21}$ and $R_{22}$ arranged on the rear side of the array of the terminal portions p, q, r, and s are remote from the magnetic recording medium 1 and are not influenced by variations of the field intensities due to rotation of the magnetic recording medium 1. Therefore, no resistance variations occur in these resistive portions $R_{11}$, $R_{12}$, $R_{21}$ and $R_{22}$. Consequently, the resistance variations of the resistive portions $R_{31}$, $R_{32}$, $R_{41}$ and $R_{42}$ appear as a voltage variation across the sensor output terminals q and s of the bridge circuit.

Thus, when the magnetoresistive sensor assembly 8 shown in FIG. 19 is disposed at such a position that the terminal portions p, q, r and s are situated substantially outside of the magnetic recording medium 1 as shown in FIG. 17, the leads connected to the respective terminal portions p, q, r and s and the protuberant heads of solder used for providing the soldered connections would not obstruct the rotation of the magnetic recording medium 1. Therefore, the field responsive resistive portions $R_{31}$, $R_{32}$, $R_{41}$ and $R_{42}$ can be disposed as close to the magnetic recording medium 1 as possible thereby improving the sensor sensitivity.

Further, due to the fact that the pattern of the magnetoresistive element 2 of FIG. 17 is formed on a substrate by means such as evaporation as described hereinbefore, the field response resistive portions of the magnetoresistive element can be positioned at their predetermined relative positions with high accuracy, and the number of derivable pulses can be increased. Thus, the present invention provides a rotary encoder which can operate with high accuracy of signal sensing and which can be manufactured to satisfy the dimensional requirements.

Figure 20:
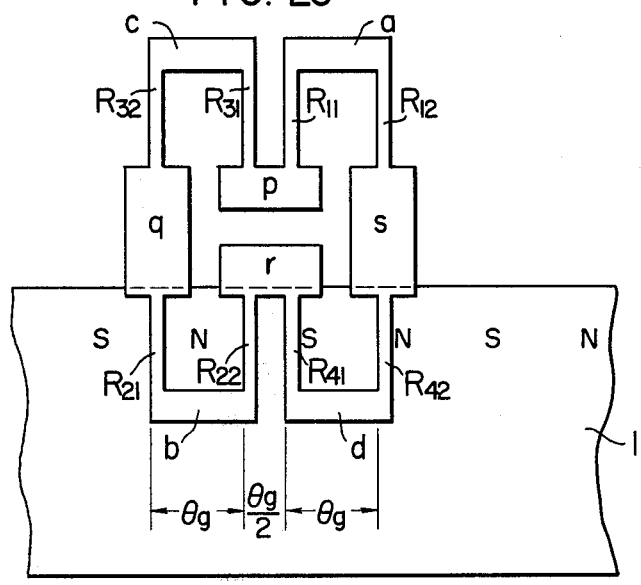
FIG. 20 is an enlarged schematic plan view of a main part of another embodiment of the rotary encoder according to the present invention.
Figure 21:
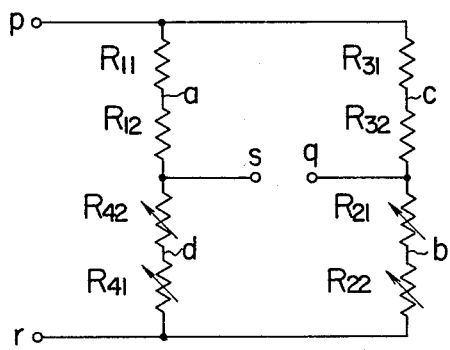
FIG. 21 is an electrical circuit diagram of the rotary encoder shown in FIG. 20.

FIG. 20 shows another embodiment of the present invention which comprises a magnetoresistive element having a structure forming a bridge circuit as shown in FIG. 21.

Referring to FIG. 20, a magnetoresistive element 2 comprises terminal portions p, q, r, s, resistive portions $R_{11}$, $R_{12}$, $R_{21}$, $R_{22}$, $R_{31}$, $R_{32}$, $R_{41}$, $R_{42}$ and connecting or bridging portions a, b, c, d. All of the terminal portions, resistive portions and bridging portions are intergrally combined to provide the magnetoresistive element 2 of a single pattern. As seen in FIG. 21, the terminal portions p and r operate as a pair of input terminals, while the terminal portions q and s operate as a pair of sensor output terminals.

As shown in FIG. 21, a pair of resistive portions are inserted in each of the four arms of the bridge circuit. Referring to FIG. 20, the resistive portions $R_{21}$, $R_{22}$ and $R_{41}$, $R_{42}$ are arranged on the front side of the array of the terminal portions p, q, r, s so that they are opposed by magnetic information recorded on a magnetic recording medium 1. On the other hand, the resistive portions $R_{11}$, $R_{12}$ and $R_{31}$, $R_{32}$ are arranged on the rear side of the terminal portions p, q, r, s.

To constitute the bridge circuit as described above, the resistive portions $R_{31}$ and $R_{11}$ are oppositely connected to each other to the terminal portion p, the resistive portions $R_{32}$ and $R_{21}$ are oppositely connected to each other to the terminal portion q, the resistive portions $R_{41}$ and $R_{22}$ are oppositely connected to each other to the terminal portion r, and the resistive portions $R_{42}$ and $R_{12}$ are oppositely connected to each other to the terminal portion s. Further, the resistive portion $R_{11}$ is connected to the resistive portion $R_{12}$ by the bridging portion a, the resistive portion $R_{21}$ is connected to the resistive portion $R_{22}$ by the bridging portion b, the resistive portion $R_{31}$ is connected to the resistive portion $R_{32}$ by the bridging portion c, and the resistive portion $R_{41}$ is connected to the resistive portion $R_{42}$ by the bridging portion d. The terminal portions p, q, r, s and the bridging portions a, b, c, d, are designed to be wider than the resistive portions $R_{11}$, $R_{12}$, $R_{21}$, $R_{22}$, $R_{31}$, $R_{32}$, $R_{41}$ and $R_{42}$ so that they have a sufficiently lower resistance value.

It is so designed that a distance of $\theta g$ is maintained between the resistive portions $R_{21}$ and $R_{22}$ and between the resistive portions $R_{41}$ and $R_{42}$ arranged on the front side of the terminal portions q, r and s. This distance $\theta g$ is designed to be m times (where m is a positive integer) the width $\theta m$ of each information unit recorded on the magnetic recording medium 1 shown in FIG. 20, and $\theta g$ is selected to be equal to $\theta m$ in this embodiment. On the other hand, it is so designed that a distance of $(2n-1)\theta g/2$ (where n is a positive integer) is maintained between the resistive portions $R_{22}$ and $R_{41}$. These resistive portions $R_{21}$, $R_{22}$, $R_{41}$ and $R_{42}$ are disposed close and opposite to the magnetic information recorded on the magnetic recording medium 1. Since the resistive portions $R_{21}$, $R_{22}$ and $R_{41}$, $R_{42}$ are 90° out of phase, their resistance values vary with a 90° phase difference depending on the intensities of magnetic fields during rotation of the magnetic recording medium 1.

On the other hand, the resistive portions $R_{31}$, $R_{32}$, $R_{11}$ and $R_{12}$ arranged on the rear side of the terminal portions p, q and s are remote from the magnetic recording medium 1 and are not influenced by variations of the field intensities due to rotation of the magnetic recording medium 1. Therefore, no resistance variations occur in these resistive portions $R_{31}$, $R_{32}$, $R_{11}$ and $R_{12}$. Consequently, the resistance variations of the resistive portions $R_{21}$, $R_{22}$, $R_{41}$ and $R_{42}$ appear as a voltage variation across the sensor output terminals q and s of the bridge circuit.

The magnetoresistive element 2 shown in FIG. 20 is formed by, for example, evaporating or photo-eching a magnetoresistive material such as permalloy on the surface of a planar substrate of an electrical insulating material such as glass, in the same manner as described with reference to FIG. 4. Then, such a protective covering as shown in FIG. 4 of a material such as glass is bonded to the substrate to provide a magnetoresistive sensor assembly.

Figure 22:
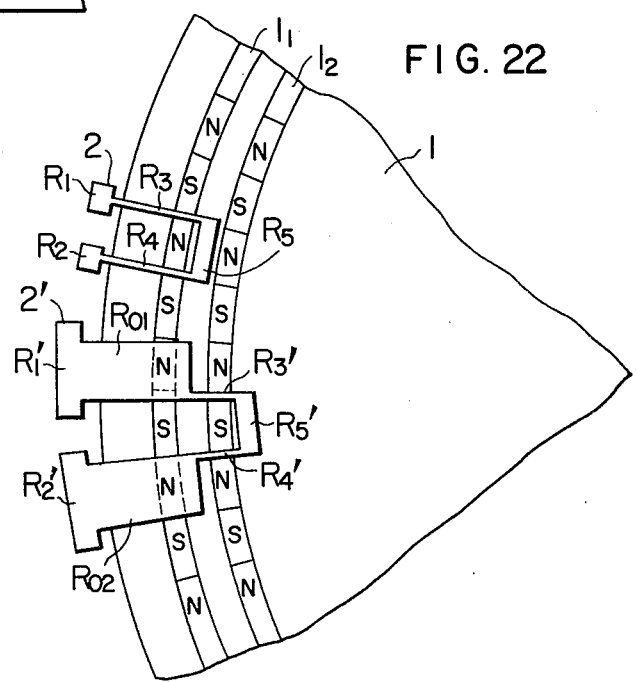
FIG. 22 is an enlarged schematic plan view of a main part of a further embodiment of the rotary encoder according to the present invention.

FIG. 22 shows another embodiment of the present invention and is an actual application of the embodiments shown in FIGS. 1 and 8. In the embodiment shown in FIG. 22, two series of magnetic information are recorded on two concentric tracks $1_1$ and $1_2$ of a magnetic recording medium 1, and the encoder comprises a first magnetoresistive element 2 for sensing magnetic information recorded on the first track $1_1$, and a second magnetoresistive element 2' for sensing magnetic information recorded on the second track $1_2$. The first magnetoresistive element 2 does not differ from that employed in the embodiment shown in FIGS. 1 to 7. However, the second magnetoresistive element 2' comprises terminal portions $R_1'$, $R_2'$ corresponding to the lead connection terminal portions $R_1$, $R_2$ of the magnetoresistive element 2, sensing portions $R_3'$, $R_4'$ corresponding to the sensing portions $R_3$, $R_4$, and a bridging portion $R_5'$ corresponding to the bridging portion $R_5$, and in addition, it further comprises a bridging portion $R_{01}$ connecting the sensing portion $R_3'$ to the terminal portion $R_1'$ and a bridging portion $R_{02}$ connecting the sensing portion $R_4'$ to the terminal portion $R_{02}$. The circumferential width of the bridging portions $R_{01}$ and $R_{02}$ is selected to be equal to the pitch of magnetic information recorded on the track $1_1$, so that these bridging portions $R_{01}$ and $R_{02}$ are insensitive to the magnetic information recorded on the track $1_1$. Preferably, these two magnetoresistive element 2 and 2' are formed on a single substrate by evaporating or photo-etching a magnetoresistive material such as permalloy, and a protecting covering of glass is then bonded to the substrate to provide an integral assembly, in the same manner as described with reference to FIG. 4. According to the method above described, the magnetoresistive elements 2 and 2' can be maintained in their accurate positional relation.

The bridge circuits shown in FIGS. 17, 18, 20 and 21 are merely illustrative of examples, and it is to be understood that various other modifications may be made without departing from the spirit and scope of the present invention. In the embodiments shown in FIGS. 17 and 20, the magnetoresistive element shown in FIGS. 1 to 8 is applied and two of them are connected in a bridge pattern to provide a single magnetoresistive element. It will be readily understood that two of the magnetoresistive elements shown in FIGS. 10 to 15 may be similarly connected in a bridge pattern to provide a single magnetoresistive element which exhibits satisfactory results.

A plurality of magnetoresistive elements as shown in FIGS. 1 to 9 or a plurality of magnetoresistive elements as shown in FIGS. 10 to 15 may be disposed in equally circumferentially spaced relation on an outer peripheral area of a surface of a disc-shaped substrate so as to sense absolute angular positions of the rotation. It is to be

We claim:

1. A rotary magnetic encoder for use with a rotary body having plural pieces of magnetic information recorded on at least one circumferentially running track, said rotary magnetic encoder comprising at least one magnetoresistive element including at least two members extending substantially in the radial direction of said rotary body in a relation opposite to and overlying said magnetic information recorded on said track of said rotary body, two lead connection terminals formed at the outer ends of said radially extending members respectively, and a circumferentially extending member interconnecting said radially extending members at their ends, so as to form a signal path which passes both of said radially extending members and terminates in said two lead connection terminals, said lead connection terminals having at least portions thereof disposed outside of the outer peripheral edge of said rotary body, said rotary body being a magnetic recording medium and said pieces of magnetic information being arranged on said track with a predetermined pitch λ, said encoder further comprising a substrate having a surface disposed opposite to and at least partially overlying said rotary body, said magnetoresistive element being formed of a ferromagnetic material and provided on the surface of said substrate, said magnetoresistive element being formed on the surface of said substrate as an integral pattern, at least one of said radially extending members being a sensing member, and protective covering means provided on at least said radially extending members.

2. A magnetic rotary encoder as claimed in claim 1, wherein said magnetoresistive element includes two radially extending members each of which acts as a sensing member, and the pitch of said sensing members is selected to be nλ where n is a positive integer.

3. A magnetic rotary encoder as claimed in claim 1, wherein said magnetoresistive element includes two radially extending members, and one of said radially extending members acts as a sensing member, while the other acts merely as a bridging member, the width of said bridging member when viewed in the circumferential direction being selected to be equal to λ.

4. A magnetic rotary encoder as claimed in claim 1, wherein said magnetroresistive element includes m radially extending members (where m is a positive even number larger than and including 4), and said two lead connection terminals are formed at the respective outer ends of the outermost two of said m radially extending members.

5. A magnetic rotary encoder as claimed in claim 4, wherein all of said radially extending members act as sensing members and the pitch of said sensing members is selected to be λ/n where n is a positive integer larger than 2.

6. A magnetic rotary encoder as claimed in claim 2, 3 or 5, wherein a first magnetroresistive element and a second magnetroresistive element are to be juxtaposed in the circumferential direction of said rotary body, outer resistive portions are formed at portions corresponding to positions outside of the outer peripheral edge of said rotary body, and connecting portions are formed to establish a bridge connection together with said outer resistive portions and the individual sensing portions of said first and second magnetroresistive elements.

7. A magnetic rotary encoder as claimed in claim 2, wherein a first magnetoresistive element and a second magnetoresistive element are to be juxtaposed in the circumferential direction of said rotary body, outer resistive members are formed at portions corresponding to positions outside of the outer peripheral edge of said rotary body, and connecting members are formed to establish a bridge connection together with said outer resistive members and the individual sensing members of said first and second magnetoresistive elements, the value of n is selected to be unity (1), the circumferential pitch of said first and second magnetoresistive elements being selected to be equal to the pitch λ of said pieces of recorded magnetic information, the four lead connection terminal members, two of which belong to said first magnetoresistive element and the remaining two of which belong to said second magnetoresistive element, being circumferentially arranged, each of said outer resistive members extending radially outwardly from one of said four lead connection terminal members, said connecting members including an outer bridging portion connecting the outer ends of the outermost two of said four resistive members and an inner bridging portion connecting the outer ends of the innermost two resistive members, and the first and third ones of said four lead connection terminal members when viewed in the circumferential direction being used as a pair of input terminals of said bridge connection, while the remaining two of said lead connection terminal portions are used as a pair of output terminals of said bridge connection.

8. A magnetic rotary encoder as claimed in claim 2, wherein a first magnetoresistive element and a second magnetoresistive element are to be juxtaposed in the circumferential direction of said rotary body, outer resistive members are formed at portions corresponding to positions outside of the outer peripheral edge of said rotary body, and connecting members are formed to establish a bridge connection together with said outer resistive members and the individual sensing members of said first and second magnetoresistive elements, the value of n is selected to be unity (1), the circumferential pitch of said first and second photoresistive elements being selected to be ½ of the pitch λ of said pieces of recorded magnetic information, the four lead connection terminal members, two of which being to said first magnetoresistive element and the remaining two of which belong to said second magnetoresistive element, being circumferentially arranged, the outermost two of said four lead connection terminals being used as a pair of output terminals of said bridge connection, the innermost two of said lead connection terminal members being integrally connected so as to be used as one of a pair of input terminals of said bridge connection, the other of said input terminal pair being disposed radially outward and opposite to said one of said input terminal pair so that it is formed discretely relative to said output terminal pair and said one of said input terminal pair, said outer resistive members including one resistive member extending radially outwardly from each of said output terminal pair and two resistive members extending radially outwardly from the other of said input terminal pair, and said connecting members include a bridging portion interconnecting the outer ends of the first and second ones of said four resistive portions when viewed in the circumferential direction and another bridging portion interconnecting the outer ends of the third and fourth ones of said resistive members.

9. A magnetic rotary encoder as claimed in claim 2, 3, 4 or 5, wherein said rotary body has plural pieces of magnetic information recorded on each of two circumferentially running concentric tracks, and a first magnetoresistive element and a second magnetoresistive element are provided in circumferentially juxtaposed relation, said first magnetoresistive element sensing the magnetic information recorded on the outer one of said two tracks, and said second magnetoresistive element sensing the magnetic information recorded on the inner track.

10. A magnetic rotary encoder as claimed in claim 9, wherein said sensing members formed on said radially extending members of said second magnetoresistive element are provided on portions lying over the magnetic information recorded on said inner track, and portions lying over the magnetic information recorded on said outer track act as bridging members and have a circumferential width selected to be equal to the pitch of the pieces of magnetic information recorded on said second track.

11. A magnetic rotary encoder as claimed in claim 1, wherein said protective covering means is a transparent covering means.

12. A magnetic rotary encoder as claimed in claim 11, wherein said substrate and said transparent covering means are made of a glass material, and said glass covering is bonded to said substrate by a bonding agent interposed between said glass covering and said substrate so as to completely cover at least said radially extending members of said magnetoresistive element.

13. A magnetic rotary encoder as claimed in claim 1, wherein said portions of said lead connection terminals disposed outside of the outer peripheral edge of said rotary body have lead connections thereat, said radially extending members being disposed opposite to and closely spaced from said rotary body to improve the sensing sensitivity of said magnetoresistive element, the spacing of said magnetoresistive element from said rotary body being independent of the thickness of said lead connections.

14. A magnetic rotary encoder as claimed in claim 13, wherein the spacing of said magnetoresistive element from said rotary body is less than the thickness of said lead connections.

15. A magnetic rotary encoder as claimed in claim 1, wherein said recording medium is one of a magnetic disc and magnetic drum, at least two of said radially extending members being sensing members, the two sensing members having a pitch selected to be substantially nλ, where n is a positive integer, and said protective covering means covering said magnetoresistive element other than said lead connection terminals thereof.

16. A rotary magnetic encoder for use with a rotary body having plural pieces of magnetic information recorded on at least one circumferentially running track, said rotary magnetic encoder comprising at least one magnetoresistive element including at least two members extending transversely to the running direction of said track in a relation opposite to and overlying said magnetic information recorded on said track of said rotary body, two lead connection terminals formed at the outer ends of said transversely extending members, respectively, and an interconnecting member interconnecting said transversely extending members at their ends, so as to form a single electrical signal path which passes both of said transversely extending members and terminates in said two lead connection terminals, said lead connection terminals having at least portions thereof disposed outside of the outer peripheral edge of said rotary body, said interconnecting member extending in the running direction of said track, said rotary body being a magnetic recording medium and said pieces of magnetic information being arranged on said track with a predetermined pitch λ, said encoder further comprising a substrate having a surface disposed opposite to and at least partially overlying said rotary body, said magnetoresistive element being formed of a ferromagnetic material and provided on the surface of said substrate, said magnetoresistive element being formed on the surface of said substrate as an integral pattern, at least one of said transversely extending members being a sensing member, and protective covering means provided on at least said transversely extending members.

17. A magnetic rotary encoder as claimed in claim 16, wherein said protective covering means is a transparent covering means.

18. A magnetic rotary encoder as claimed in claim 17, wherein said substrate and said transparent covering means are made of a glass material, and said glass covering is bonded to said substrate by a bonding agent interposed between said glass covering and said substrate so as to completely cover at least the individual sensing members of said magnetoresistive elements.

19. A magnetic rotary encoder as claimed in claim 16, wherein said portions of said lead connection terminals disposed outside of the outer peripheral edge of said rotary body have lead connections thereat, said transversely extending members being disposed opposite to and closely spaced from said rotary body to improve the sensing sensitivity of said magnetoresistive element, the spacing of said magnetoresistive element from said rotary body being independent of the thickness of said lead connections.

20. A magnetic rotary encoder as claimed in claim 19, wherein the spacing of said magnetoresistive element from said rotary body is less than the thickness of said lead connections.

21. A magnetic rotary encoder as claimed in claim 16, wherein said recording medium is one of a magnetic disc and magnetic drum, at least two of said transversely extending members being sensing members, the two sensing members having a pitch selected to be substantially n λ, where n is a positive integer, and said protective covering means covering said magnetoresistive element other than said lead connection terminals thereof.

* * * * *